(12) United States Patent
Miroshnichenko

(10) Patent No.: US 11,309,587 B2
(45) Date of Patent: Apr. 19, 2022

(54) TEMPERATURE AND VOLTAGE CONTROLLED MULTI-LEVEL BATTERY ELECTROLYTE LEVEL MONITOR

(71) Applicant: Ivan Miroshnichenko, Milton (CA)

(72) Inventor: Ivan Miroshnichenko, Milton (CA)

( * ) Notice: Subject to any disclaimer, the term of this patent is extended or adjusted under 35 U.S.C. 154(b) by 425 days.

(21) Appl. No.: 16/512,600

(22) Filed: Jul. 16, 2019

(65) Prior Publication Data

US 2020/0036052 A1 Jan. 30, 2020

Related U.S. Application Data

(60) Provisional application No. 62/702,673, filed on Jul. 24, 2018.

(51) Int. Cl.
| | | |
|---|---|---|
| *H01M 10/00* | (2006.01) | |
| *H01M 10/42* | (2006.01) | |
| *G05D 7/06* | (2006.01) | |
| *H01M 10/06* | (2006.01) | |

(52) U.S. Cl.
CPC ...... *H01M 10/4242* (2013.01); *G05D 7/0635* (2013.01); *H01M 10/06* (2013.01)

(58) Field of Classification Search
CPC . H01M 10/4242; H01M 10/488; H01M 10/06
See application file for complete search history.

(56) References Cited

U.S. PATENT DOCUMENTS

| | | | | |
|---|---|---|---|---|
| 2011/0236730 A1* | 9/2011 | Jones | ............ | H01M 50/60 |
| | | | | 429/50 |
| 2012/0068668 A1* | 3/2012 | Kittell | ............ | B60L 50/64 |
| | | | | 320/162 |

\* cited by examiner

*Primary Examiner* — Cynthia H Kelly
*Assistant Examiner* — Monique M Wills
(74) *Attorney, Agent, or Firm* — Ryan W. Dupuis; Kyle R. Satterthwaite; Ade & Company Inc.

(57) ABSTRACT

A battery monitoring device includes a controller connected to terminals of a battery for monitoring the charging of the battery. A flow sensor is connected to a watering conduit to monitor a watering condition of the battery. A probe may be provided in communication with the electrolyte within each cell of the battery for monitoring electrolyte levels. A fan is operated by the controller if a temperature sensor senses the temperature of the battery is above a prescribed temperature threshold or if the voltage monitored across the terminals is indicative of completion of a charging cycle of the battery. An indicator coupled to the controller serves to indicate when watering of the battery is needed according to watering criteria, or to indicate when a watering of the battery has been completed.

18 Claims, 9 Drawing Sheets

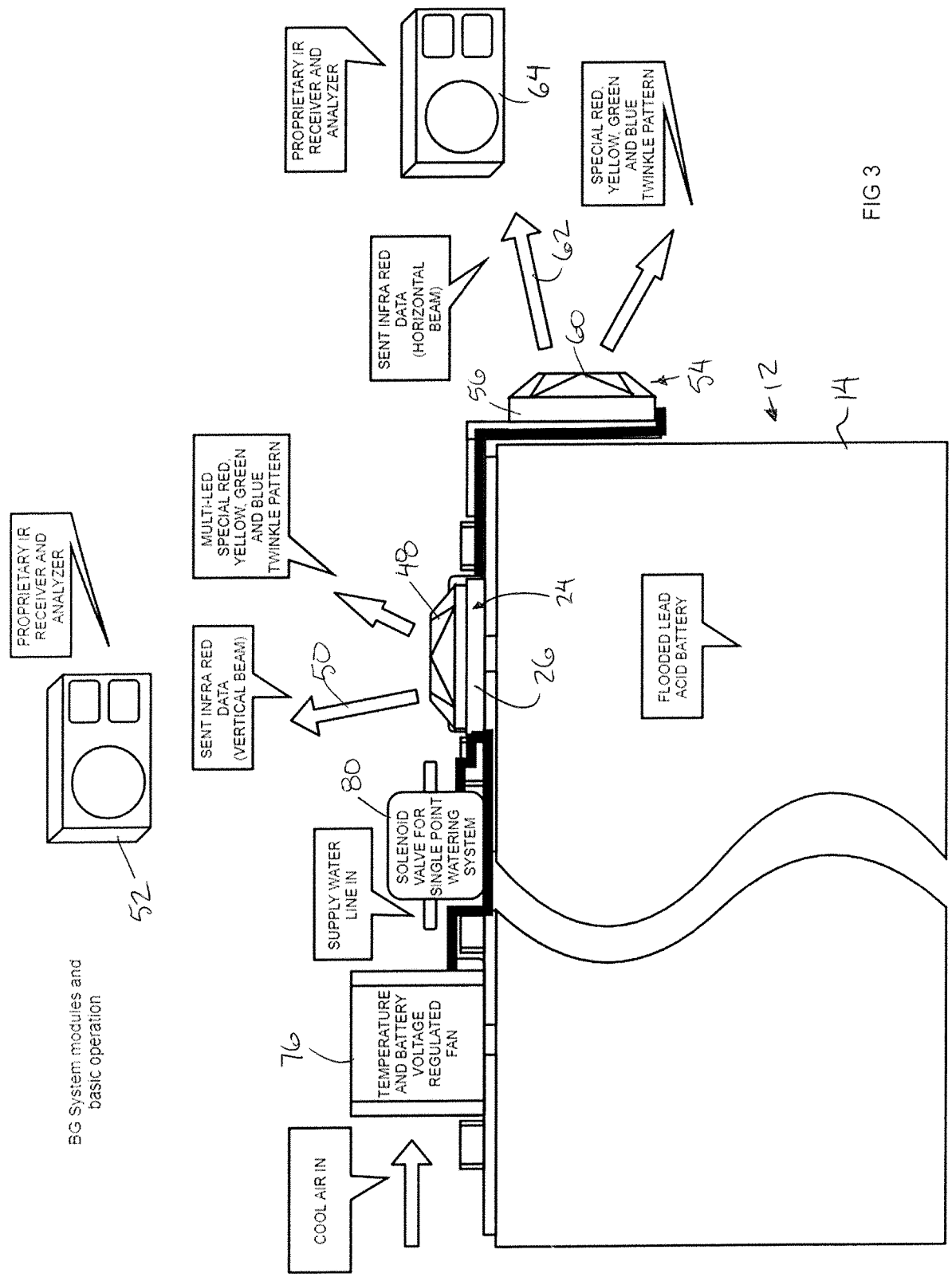

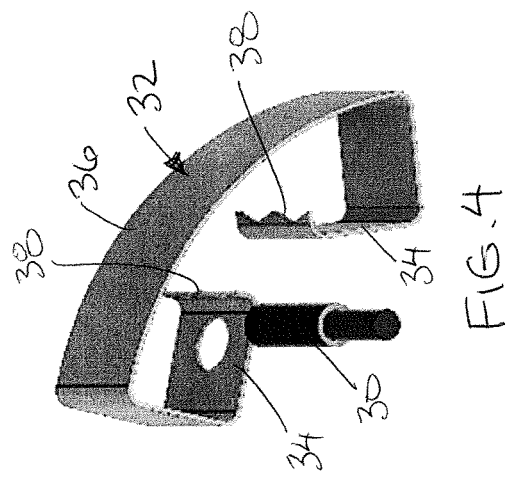
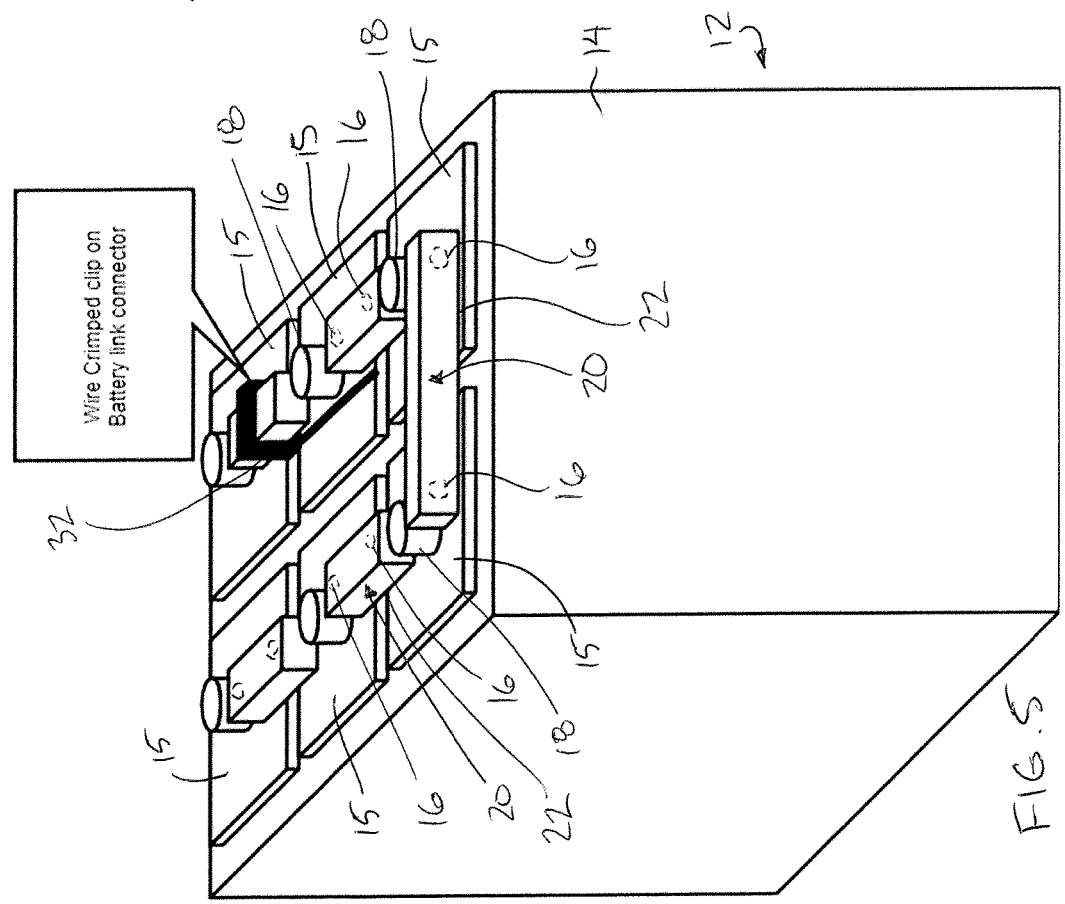

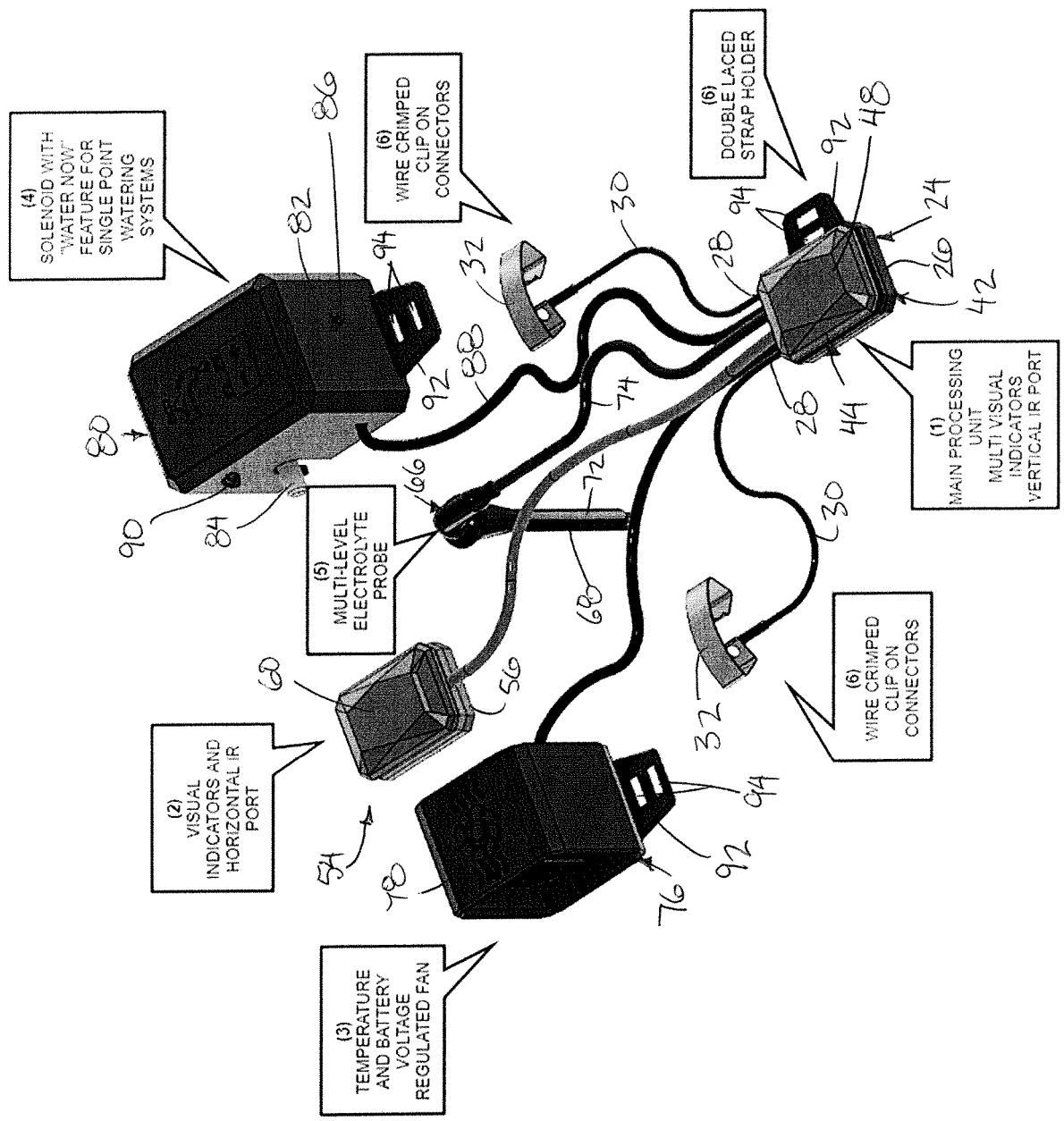

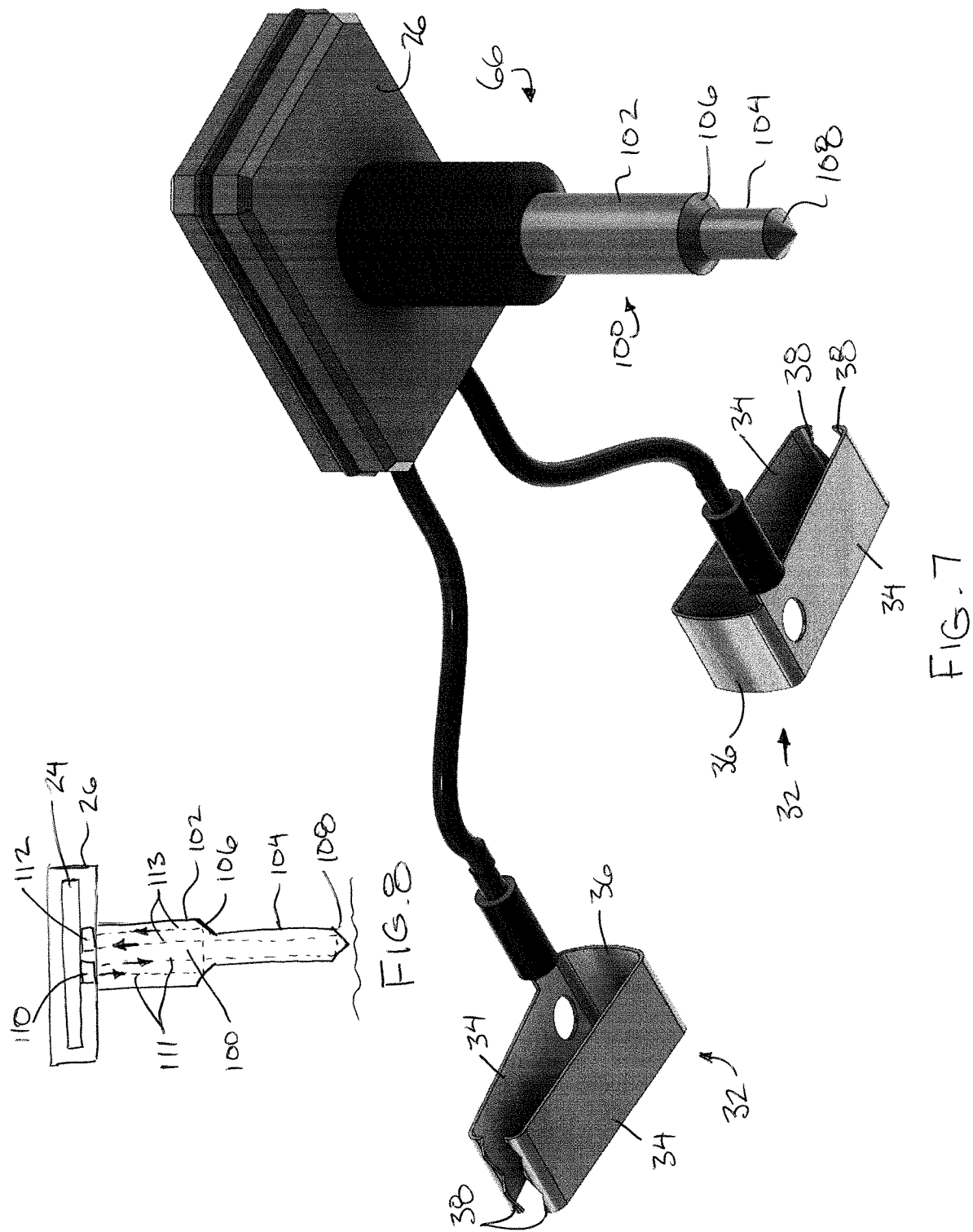

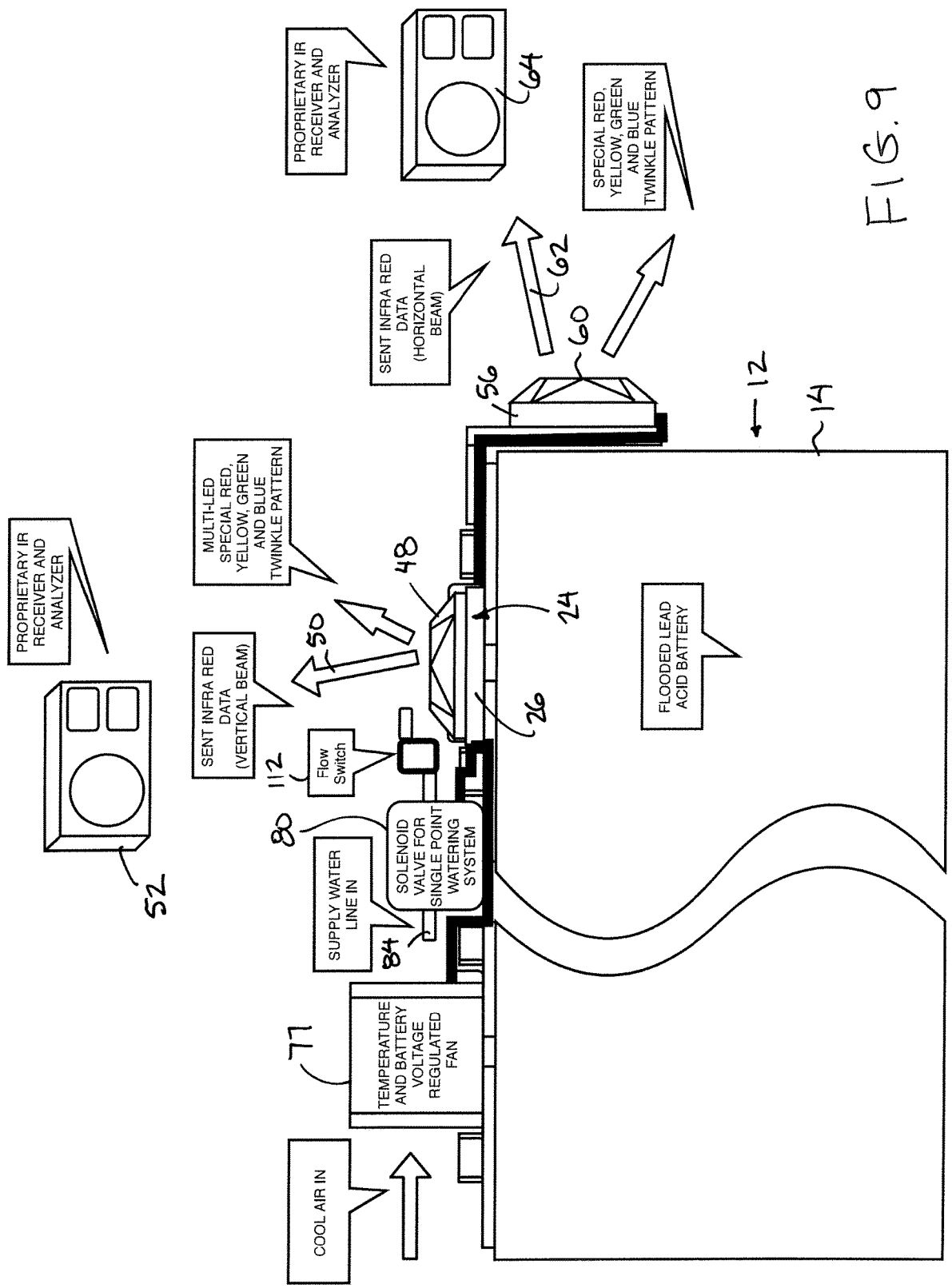

TEMPERATURE AND VOLTAGE CONTROLLED MULTI-LEVEL BATTERY ELECTROLYTE LEVEL MONITOR

This application claims the benefit under 35 U.S.C. 119(e) of U.S. provisional application Ser. No. 62/702,673, filed Jul. 24, 2018.

FIELD OF THE INVENTION

The present invention relates to a battery monitor which monitors electrolyte level, temperature and/or voltage across terminals of the battery for automatically watering the battery up to an optimum electrolyte level in an efficient manner.

BACKGROUND

Various types of battery monitors exist for monitoring the level of electrolyte within a battery, however, known battery monitors are limited in their ability to automatically water the battery in an efficient and effective manner. Typical monitors only monitor if the level of electrolyte has reached a single minimum level within the battery which is insufficient to determine how much water to add, so that typical water systems only add a prescribed volume of fluid or add fluid at a fixed rate for a prescribed duration which is very imprecise. The affects of battery temperature variation on the electrolyte level are also not considered in a typical battery monitor. Existing battery monitors are also unable to autonomously determine the most efficient and effective time to water the battery.

SUMMARY OF THE INVENTION

According to one aspect of the present invention there is provided a device for monitoring a battery having multiple cells and a varying electrolyte level, the device comprising:
  a water conduit connectable to a water source;
  a plurality of nozzles adapted to be mounted on the battery in communication with the multiple cells respectively;
  the plurality of nozzles being connected to the water conduit so as to receive a flow of water from the water conduit through the nozzles for distribution to the multiple cells of the battery;
  a flow sensor operatively connected to the water conduit so as to be arranged to detect a flow of water through the water conduit;
  a positive indicator which is indicative that the battery has been watered;
  and a controller operatively connected to the flow sensor and the indicator so as to be arranged to operate the positive indicator in response to detection of the flow of water through the water conduit so as to indicate that the battery has been watered.

The device may further include a solenoid-controlled valve operatively connected between the water conduit and the plurality of nozzles so as to be operable between an open condition permitting a flow of water from the water conduit through the nozzles for distribution to the multiple cells of the battery and a closed condition interrupting the flow of water from the water conduit to the nozzles. In this instance, the controller may be arranged to close the solenoid-controlled valve in response to detection of an absence of the flow of water through the conduit by the flow sensor.

According to one preferred embodiment, the controller includes a memory storing watering criteria and programming instructions thereon and a processor for executing the programming instructions so as to be arranged to (i) communicate with the flow sensor to determine when the battery has been watered, (ii) determine a watering condition in response to watering criteria since last watering of the battery being met, and (iii) deactivate the positive indicator in response to determination of the watering condition.

The device may further include a watering indicator which is indicative that the battery needs to be watered. In this instance, the controller is preferably arranged to activate the watering indicator in response to determination of the watering condition.

According to a second aspect of the present invention there is provided a device for monitoring a battery having multiple cells and a varying electrolyte level, the device comprising:
  a water conduit connectable to a water source;
  a plurality of nozzles adapted to be mounted on the battery in communication with the multiple cells respectively;
  the plurality of nozzles being connected to the water conduit so as to receive a flow of water from the water conduit through the nozzles for distribution to the multiple cells of the battery;
  a flow sensor operatively connected to the water conduit so as to be arranged to detect a flow of water through the water conduit;
  a watering indicator which is indicative that the battery needs watering;
  a controller operatively connected to a pair of terminals of the battery and to the flow sensor;
  the controller including a memory storing watering criteria and programming instructions thereon and a processor for executing the programming instructions so as to be arranged to (i) communicate with the flow sensor to determine when the battery has been watered (ii) determine a watering condition in response to watering criteria since last watering of the battery being met, and (iii) activate the watering indicator in response to determination of the watering condition.

When the controller is operatively connected between a pair of terminals of the battery so as to be adapted to determine when the battery has undergone a charging cycle, the watering criteria may include a prescribed number of charging cycles such that the watering condition is determined to be met if the number of charging cycles since the flow sensor has detected the flow of water through the water conduit exceeds the prescribed number of charging cycles.

When the controller is adapted to determine a duration since the flow sensor has detected the flow of water through the water conduit, the watering criteria may include a prescribed duration such that the watering condition is determined to be met if the duration since the flow sensor has detected the flow of water through the water conduit exceeds the prescribed duration.

Furthermore, the watering criteria may include both a prescribed number of charging cycles and a prescribed duration such that the watering condition is determined to be met if either (i) the number of charging cycles since the flow sensor has detected the flow of water through the water conduit exceeds the prescribed number of charging cycles, or (ii) the duration since the flow sensor has detected the flow of water through the water conduit exceeds the prescribed duration.

When the device further includes a solenoid-controlled valve operatively connected between the water conduit and the plurality of nozzles so as to be operable between an open condition permitting a flow of water from the water conduit through the nozzles for distribution to the multiple cells of the battery and a closed condition interrupting the flow of water from the water conduit to the nozzles, the controller may be arranged to open the solenoid-controlled valve in response to determination of the watering condition.

According to a further aspect of the invention there is provided a device for monitoring a battery having multiple cells and a varying electrolyte level, the device comprising:
  a water conduit connectable to a water source;
  a plurality of nozzles adapted to be mounted on the battery in communication with the multiple cells respectively;
  a valve operatively connected between the water conduit and the plurality of nozzles so as to be operable between an open condition allowing flow of water from the water conduit through the nozzles for distribution so the multiple cells of the batter and a closed condition interrupting flow from the water conduit to the nozzles;
  a probe adapted to be operatively connected to the battery so as to sense when the electrolyte level is below a prescribed operating level;
  a controller adapted to be electrically connected between a pair of terminals of the battery and being operatively connected to the probe;
  the controller including a memory storing programming instructions thereon and a processor for executing the programming instructions so as to be adapted to monitor voltage across the pair of terminals and determine a charging condition when the voltage monitored across the terminals is indicative of completion of a charging cycle of the battery, and displace the valve from the closed condition to the open condition when both (i) the probe indicates that the electrolyte level is below the prescribed operating level and (ii) the charging condition has been determined.

Preferably the controller is arranged to determine the charging condition when the voltage across the terminals drops below a lower threshold amount subsequent to the voltage remaining above an upper threshold amount.

According to another aspect of the present invention there is provided a device for monitoring a battery having a varying electrolyte level, the device comprising:
  a probe adapted to be operatively connected to the battery so as to sense when the electrolyte level is above a minimum operating level and when the electrolyte level is above an intermediate level that is spaced above the minimum operating level;
  a controller in communication with the probe, the controller including a memory storing programming instructions thereon and a processor for executing the programming instructions so as to be adapted to:
    (i) determine a first notification condition when the probe senses that the electrical level is neither above the minimum operating level nor the intermediate level;
    (ii) determine a second notification condition when the probe senses that the electrical level is above the minimum operating level but not above the intermediate level; and
    (iii) determine a third notification condition when the probe senses that the electrical level is above both the minimum operating level and the intermediate level; and
  an indicator in communication with the controller and being adapted to:
    generate a first notification detectable by an operator in response to determination of the first notification condition;
    generate a second notification detectable by an operator in response to determination of the second notification condition; and
    generate a third notification detectable by an operator in response to determination of the third notification condition.

The probe may comprise an immersion probe having two conductors in communication with the electrolyte at the minimum operating level and at the intermediate level respectively. Preferably, the two conductors communicate through a common aperture in a casing of the battery and are received within respective channels of a common insulated housing.

According to another aspect of the present invention there is provided a device for monitoring a battery having a varying electrolyte level, the device comprising:
  a probe adapted to be operatively connected to the battery so as to sense when the electrolyte level is above a prescribed operating level;
  a controller in communication with the probe, the controller including a memory storing programming instructions thereon and a processor for executing the programming instructions so as to be adapted to determine a notification condition when the probe senses that the electrolyte level is not above the prescribed operating level;
  a first indicator in communication with the controller so as to generate a first notification in response to determination of the notification condition; and
  a second indicator in communication with the controller so as to generate a second notification simultaneously with the first notification in response to determination of the notification condition;
  the first indicator being adapted to be supported on top of the battery; and
  the second indicator being adapted to be supported on an upright side surface of the battery.

According to another aspect of the present invention there is provided a device for monitoring a battery having a varying electrolyte level for use with a signal receiver, the device comprising:
  a probe adapted to be operatively connected to the battery so as to sense when the electrolyte level is above a prescribed operating level;
  a controller in communication with the probe, the controller including a memory storing programming instructions thereon and a processor for executing the programming instructions so as to be adapted to determine a notification condition when the probe senses that the electrolyte level is not above the prescribed operating level; and
  an indicator adapted to be supported on the battery, the indicator being in communication with the controller so as to generate a notification signal in response to determination of the notification condition, the notification signal comprising a horizontally projected beam of light which is detectable by the signal receiver.

According to another aspect of the present invention there is provided a device for monitoring a battery having a varying electrolyte level for use with a signal receiver, the device comprising:
  a probe adapted to be operatively connected to the battery so as to sense when the electrolyte level is above a prescribed operating level;
  a controller in communication with the probe, the controller including a memory storing programming instructions thereon and a processor for executing the programming instructions so as to be adapted to determine a notification condition when the probe senses that the electrolyte level is not above the prescribed operating level;

an indicator adapted to be supported on the battery, the indicator being in communication with the controller so as to generate a notification signal in response to determination of the notification condition, the notification signal comprising a vertically projected beam of light which is detectable by the signal receiver.

The controller may also determine a second condition when the probe senses that the electrolyte level is above the prescribed operating level, in which the indicator projects a continuous, coded, pulsed beam of light which various between the notification signal and a second signal according to detection by the controller of the notification condition or the second condition respectively.

According to another aspect of the present invention there is provided a device for monitoring a battery, the device comprising:

a temperature sensor adapted to be operatively connected to the battery so as to sense a temperature of the battery;

a voltage sensor for monitoring voltage across two terminals of the battery;

a controller in communication with the temperature sensor and the voltage sensor, the controller including a memory storing programming instructions thereon and a processor for executing the programming instructions so as to be adapted to determine an overheated condition when the temperature sensor senses that the temperature is above a prescribed temperature threshold or when the voltage monitored across the terminals is indicative of completion of a charging cycle of the battery; and a fan being operatively connected to the controller so as to be operable from an inactive state and an active state responsive to determination of the overheated condition.

The fan may be adapted to be supported on a top side of the battery so as to direct a flow of air across the top side of the battery in the active state.

The fan may be adapted to be in electrical connection with the battery so as to draw power from the battery in the active state of the fan.

The fan housing may further include a strap flange at a bottom side of the housing and protruding laterally outwardly from one side of the housing towards an outer free edge of the strap flange, the strap flange including a strap receiving aperture therein at a location spaced laterally inwardly from the outer free edge, the strap receiving aperture being adapted to a strap secured about the battery so as to strap the strap flange flat against an outer surface of the battery.

According to another aspect of the present invention there is provided a device for monitoring a battery having a varying electrolyte level for use with a signal receiver, the device comprising:

a probe adapted to be operatively connected to the battery so as to sense when the electrolyte level is above a prescribed operating level;

a controller in communication with the probe, the controller including a memory storing programming instructions thereon and a processor for executing the programming instructions so as to be adapted to determine a notification condition when the probe senses that the electrolyte level is not above the prescribed operating level;

an indicator adapted to be supported on the battery, the indicator being in communication with the controller so as to generate a notification signal in response to determination of the notification condition;

at least one of the controller and the indicator comprising a housing having a strap flange at a bottom side of the housing and protruding laterally outwardly from one side of the housing towards an outer free edge of the strap flange, the strap flange including a strap receiving aperture therein at a location spaced laterally inwardly from the outer free edge; and a strap adapted to be received through the strap receiving aperture while being secured about the battery so as to strap the strap flange flat against an outer surface of the battery.

The strap flange preferably includes two spaced apart strap receiving apertures between the housing and the outer free end of the strap flange so as to be adapted to receive the strap therethrough.

According to another aspect of the present invention there is provided a device for monitoring a battery comprising a plurality of cells each including two terminals, and a plurality of electrically conductive intercell connector each connecting two terminals on different cells, the device comprising:

a sensor adapted to be operatively connected to the battery for sensing an operating condition of the battery;

a controller in communication with the sensor, the controller including a memory storing programming instructions thereon and a processor for executing the programming instructions so as to be adapted to monitor the operating condition sensed by the battery; and an electrically conductive clip connected to the controller and being adapted for electrical connection to one of the intercell connectors;

the clip comprising a pair of opposing jaws having teeth formed thereon and a resilient bridge portion connected between the opposing jaws so as to bias the jaws into biting engagement into opposing surfaces of said one of the intercell connectors.

When the battery includes a plurality of non-conductive covers each fitted over one of the intercell connectors, the electrically conductive clip is preferably adapted to be received under the non-conductive cover of the intercell connector upon which it is supported.

According to preferred embodiments, the present invention provides an apparatus and a method for measuring and analyzing a flooded lead acid battery using multi-level electrolyte multiple electrode assembly, surface temperature sensing circuitry with fan cool down feature and automatic battery water refill solenoid for single point systems. Multi-level multi-electrode assembly along with battery voltage approximation and analytical circuitry, determined the ideal conditions for adding water to the system. Upon determining the ideal conditions for replenishing battery water the solenoid with "water now" feature is capable of watering a multicell battery in full auto or manual configurations. The system is also equipped with temperature sensing and heat evacuation modules. The device employs analytical and predictive processes to monitor and most efficiently add water to the flooded lead acid battery, remove excess heat and put battery in circulation in the shortest time possible. High intensity, high visibility multi color, multi-LED configuration allows for best visual condition identification from any usable distance. Integrated infrared vertical and horizontal beam generators allow to transmit battery data to stationary receiver units that analyse and output information for the user.

According to another aspect of the present invention there is provided a device for monitoring a battery having an electrolyte chamber with a varying level of electrolyte solution therein, the device comprising:

a light pipe adapted to be operatively connected to the battery so as to protrude downwardly in a longitudinal direction of the light pipe into the electrolyte chamber of the battery;

at least one reflective surface formed on the light pipe at a prescribed operating level within the electrolyte chamber such that a reflective coefficient of the reflective surface will vary between a first reflective coefficient when the reflective surface is immersed within the electrolyte solution and a second reflective coefficient when said at least one reflective surface is not immersed within the electrolyte solution;

a light emitter operatively connected to the light pipe so as direct a light signal towards said at least one reflective surface at the prescribed operating level;

a light receiver operatively connected to the light pipe so as to receive a reflected portion of the light signal that is reflected from the at least one reflective surface;

a controller operatively connected to the light receiver including a memory storing programming instructions thereon and a processor for executing the programming instructions so as to be adapted to autonomously analyse the reflected portion of the light signal and determine (i) that the level of the electrolyte solution is above the prescribed operating level if the reflected portion of the light signal is indicative of the at least one reflective surface operating according to the first reflective coefficient and (ii) that the level of the electrolyte solution is below the prescribed operating level if the reflected portion of the light signal is indicative of the at least one reflective surface operating according to the second reflective coefficient.

BRIEF DESCRIPTION OF THE DRAWINGS

Some embodiments of the invention will now be described in conjunction with the accompanying drawings in which:

FIG. 3 is a schematic side elevational view of the battery monitoring device supported on a battery;

FIG. 4 is a perspective view of a connector clip for connecting the battery monitoring device to a battery;

FIG. 5 is a perspective view of a battery including the connector clip supported thereon;

FIG. 6 is a perspective view of the various components of the battery monitoring device shown separated from the battery;

FIG. 7 is a perspective view of a second embodiment of the probe and the conductive mounting clips;

FIG. 8 is a schematic representation of the probe according to the second embodiment of FIG. 7;

FIG. 9 is a schematic side elevational view of the battery monitoring device supported on a battery according to a second embodiment of the present invention;

In the drawings like characters of reference indicate corresponding parts in the different figures.

DETAILED DESCRIPTION

Figure 1:
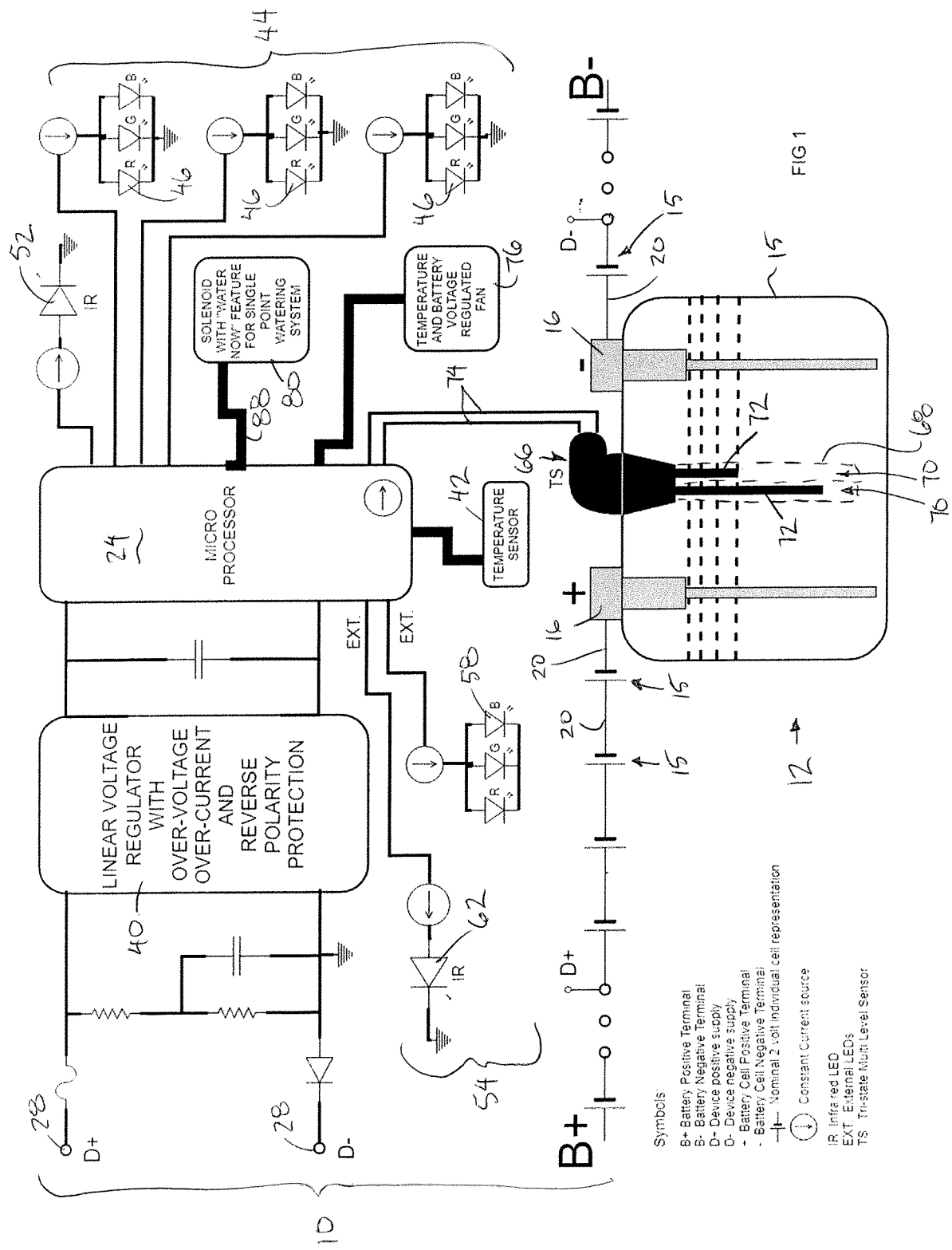
FIG. 1 is a schematic representation of the battery monitoring device.

Referring to the accompanying figures there is illustrated a battery monitoring device generally indicated by reference numeral 10. The device 10 is particularly suited for use with a multi-cell flooded lead acid battery 12 for monitoring temperature and voltage of the battery in addition to monitoring the level of the electrolyte solution within the battery for watering the battery in an efficient, effective, and autonomous manner according to the sensed conditions of the battery.

A typical battery 12 with which the battery monitoring device 10 is particularly suited comprises a casing 14 having perimeter walls and a plurality of interior walls separating the interior volume of the casing into a plurality of distinct cells 15. In the illustrated embodiment, the battery comprises six cells, each generating two volts between a pair of opposed terminals 16 of the respective cell, however many more cells may be provided in further embodiments. The casing 14 is enclosed by a top plate which includes a cap 18 operable between open and closed positions relative to an access aperture in association with each of the cells. The two terminals 16 of each cell are connected to conductive plates immersed within electrolyte solution within each cell. Conductive intercell connectors 20 are provided in connection between two of the terminals 16 on each adjacent pair of cells 15 such that the plurality of cells 16 are connected in series with one another. A removable non-conductive cover 22 fully surrounds the top and sides of each intercell connector 20.

The battery 12 described herein is particularly suited for use with a lift truck (not shown) to provide electrical power to the truck in use. Between uses, the battery is typically removed from the lift truck and stored within storage racks (not shown). A water source (not shown) is typically provided at the location of the storage racks in addition to a power source (not shown) which are connected to the battery for watering the battery and charging the battery respectively.

The device 10 includes a main controller 24 formed on a printed circuit board so as to include a memory storing programming instructions thereon and a processor for executing the programming instructions to perform the various functions of the controller as described herein. The printed circuit board is mounted within a housing 26 of the main controller which is adapted to be secured to the top of the casing 14 of the battery in the mounted position.

Electrical power is delivered to the main controller through two input terminals 28 which are connected to respective intercell connectors 20 of the battery using an elongate flexible lead wire 30 and an electrically conductive mounting clip 32 connected to each of the terminals. Each mounting clip 32 comprises two opposed jaws 34 integrally connected by a bridge portion 36 such that the jaws 34 and the bridge portion collectively form a generally U-shaped conductive member in a mounted position on a respective one of the intercell connectors 20 of the battery. The clip is formed of resilient material, for example spring steel in which the bridge portion biases the jaws inwardly towards one another so that in a relaxed state a dimension between the opposed jaws is much smaller than the corresponding dimension of the intercell connector 20. In order to mount the clip in place, the symmetrically opposed jaws are flexed outwardly and away from one another to be spaced apart by the dimension of the intercell connector received therebetween. Each of the jaws includes a row of teeth 38 projecting inwardly towards the opposed job in which the biasing force provided by the bridge portion is sufficient to cause the teeth to bite into engagement with corresponding opposing surfaces of the material forming the intercell connectors which are typically formed of a malleable conductive lead material. The two jaws and the bridge portion are formed of a continuous flat bar of material which fits in close proximity about the perimeter of the intercell connector upon which it is mounted so as not to interfere with placement of the nonconductive cover 22 of the intercell connector over top of the conductive mounting clip 32 in the mounted position thereof. The two mounting clips are typically mounted on to intercell connectors which define six cells of the battery in series therebetween so that the two input terminals 28 of the main controller are mounted across a potential difference of 12 V.

The mounting clips may be sized for clamping against two opposing upright side surfaces of the intercell connector as shown in the first embodiment of FIGS. 4 and 5, or alternatively may be sized for clamping against opposing top and bottom surfaces of the intercell connector as shown in the second embodiment of FIG. 7.

The printed circuit board includes a regulator 40 connected in series between the two terminals 28 and the processing components of the controller in which the regulator provides linear voltage regulation with overvoltage, overcurrent and reverse polarity protection.

A temperature sensor 42 is integrally formed on the printed circuit board of the main controller for being mounted in close proximity to the top plate of the casing in a mounted position of the controller housing 26 on top of the battery. The temperature sensor 42 senses temperature at the top of the battery casing and inputs the sensed temperature as a temperature signal into the main controller 24.

The main controller also communicates with a primary indicator assembly 44 which is integrally mounted on a top side of the controller housing 26. The primary indicator assembly includes a plurality of different colour LEDs 46 mounted on a top side of the controller housing which are covered by a lens 48 spanning the full side of the controller housing which occupies the maximum surface area. The lens is formed of a translucent material which is readily illuminated by the LEDs 46 when they are activated.

The primary indicator assembly also includes an infrared beam generator 50 capable of generating a pulsed, coded, beam of infrared light which is projected perpendicularly outward from the top surface of the controller housing upon which the infrared beam generator 50 is mounted. In this manner the beam generator 50 generates a vertical beam projected upwardly from the top side of the controller housing when actuated. A corresponding receiver 52 is mounted on the storage racks where the batteries are charged such that various information relating to the condition of the battery can be communicated by the pulsed beam which is transmitted vertically for reception by the receiver 52 mounted on the racks directly above a charging location for one of the batteries being charged on the racks.

A secondary indicator assembly 54 is also provided independently of the primary indicator assembly 44. The secondary indicator assembly 54 includes a respective independent housing 56 which is adapted to be mounted flat against an upright side surface of the battery casing by various means. The housing is shaped such that a broad side of the housing defining a maximum surface area of the housing faces laterally outwardly from the battery in the mounted position. A plurality of LEDs 58 are mounted on the surface of the housing 56 to be enclosed by a suitable lens 60 spanning the full outer surface of the independent housing 56 similarly to the lens of the primary indicator assembly. The independent housing 56 of the secondary indicator assembly also includes an infrared beam generator 62 which generates a pulsed, coded, beam of infrared light which is projected perpendicularly outward from the broad surface of the independent housing upon which the infrared beam generator 62 is mounted. In this manner the beam generator 62 generates a horizontal beam projected laterally outwardly from the side of the battery when actuated. A corresponding receiver 64 is mounted at an independent location within the environment where the lift trucks are used at the same height as the secondary indicator assembly 54 on the battery when the battery is mounted within a lift truck. In this manner, various information relating to the condition of the battery can be communicated by the pulsed beam for reception to the receiver 64 within the operating environment of the lift trucks to enable the data to be collected by an independent system for alerting the operator of the truck of the condition of the battery.

The device 10 further includes a level probe 66 capable of measuring the level of electrolyte solution within the battery. The probe includes a probe housing 68 formed of a nonconductive plastic material defining a pair of channels 70 which extend independently of one another along opposing sides of the housing. The housing is elongate in a longitudinal direction of the channels and is adapted to be commonly received within a single aperture at an intermediate location within one of the cells located in series between the two mounting clips 32. Each of the channels receives a respective conductor 72 therein having a bottom tip which is exposed to the interior of the respective cell of the battery that receives the electrolyte solution therein. The conductors 72 are connected to the printed circuit board of the main controller through elongate flexible lead wires 74 mounted externally on the battery. Each conductor is thus arranged to detect if the exposed bottom tip is in communication with electrolyte solution according to whether or not the bottom of the conductor is immersed within the electrolyte solution or not. The bottom of a lowermost one of the conductors is situated at a minimum operating level of the electrolyte solution, whereas the bottom of the uppermost one of the conductors is situated at an intermediate location between the minimum operating level and the full level corresponding to a recommended operating level of the electrolyte solution.

Each of the conductors generates a signal communicated to the controller when the bottom tip is immersed within the electrolyte solution. In this manner three different conditions are communicated back to the controller by the conductors 72 which communicate with different levels within the battery. More particularly the controller is adapted to (i) determine a first notification condition when the probe senses that the electrical level is neither above the minimum operating level nor the intermediate level; (ii) determine a second notification condition when the probe senses that the electrical level is above the minimum operating level but not above the intermediate level; and (iii) determine a third notification condition when the probe senses that the electrical level is above both the minimum operating level and the intermediate level. Typically, both indicator assemblies are configured to respond to each of the notification conditions to illuminate a unique colour combination of LEDs according to the condition being detected. More particularly, each indicator assembly is arranged to (i) generate a first notification detectable by an operator in response to determination of the first notification condition, for example a red warning light, (ii) generate a second notification detectable by an operator in response to determination of the second notification condition, for example a yellow warning light, and (iii) generate a third notification detectable by an operator in response to determination of the third notification condition, for example a green a warning light.

The battery monitoring device 10 also includes a fan assembly 76 including a fan housing 78 having a flat bottom arranged to be mounted against the top of the battery casing using a strap as described in further detail below. The housing 78 is open at laterally opposing sides with a fan mounted internally within the housing for rotation about a horizontal axis spanning laterally between the open sides of the housing such that rotation of the fan generates a horizontal flow of air through the fan housing 78 and across the top side of the battery casing when activated. The fan assembly is operatively connected to the main controller for operation by the main controller when various conditions are met. More particularly, the controller includes programming instructions which are adapted to determine an overheated condition of the battery when the temperature sensor senses that the temperature of the battery is above a prescribed temperature threshold. The controller is preferably also adapted to determine the overheated condition in the event that voltage monitored across the mounting clips 32 meets suitable criteria that are indicative of a charging cycle of the battery having been recently completed or is nearing completion. The fan is connected to the controller so as to be operable from the inactive state to an active state thereof responsive to determination of the overheated condition. The fan receives power through the main controller which in turn derives electrical power from the connection to the battery itself.

The device 10 also includes a watering device 80 comprising a watering housing 82 which is also includes a flat bottom adapted to be mounted against the top side of the battery casing using straps as described in further detail below. The watering device further includes a watering conduit 84 adapted to be connected to the source of water when the battery is mounted within the storage racks for charging. A valve 86 of the watering device is connected in series with the water conduit 84 and is operated by a solenoid which is operatively connected to the main controller 24 such that the main controller operates the valve between open and closed states thereof. A flexible lead wire 88 connects the solenoid to the main controller externally at the top of the battery similarly to the electrical connection of the fan assembly to the main controller.

An outlet of the water conduit 84 is connected to a manifold of conduit lines connected to a plurality of nozzles (not shown) which are mounted within the top cap apertures of the plurality of cells of the battery casing respectively. When the valve 86 is opened, water passes from the water source through the water conduit 84 and into the distribution manifold for injection into each of the cells through the respective nozzles.

The valve is opened when various watering criteria are determined by the controller to have been met. A manual override switch 90 is provided on the watering housing 82 which can be manually displaced from an off position to an on position by an operator. The main controller is adapted to open the valve for watering even if the watering criteria has not been met when the override switch 90 has been positioned in the on position.

Each of the fan housing 78, the main controller housing 26, and the watering housing 82 are adapted to be mounted onto the top side of the battery by a suitable strap flange 92 which protrudes laterally and horizontally outward from the housing at the bottom side thereof so as to be coplanar with the bottom of the housing. The strap flange 92 protrudes outward in a lateral direction from the housing to an outer free end of the flange spaced apart from the housing. A pair of strap receiving apertures 94 are provided within the strap flange at spaced apart positions in the lateral direction between the housing and the outer free end of the flange. A strap member which is secured about the circumference of the battery casing is inserted upwardly through the outermost strap aperture 94 and downwardly through the innermost strap aperture so that the strap extends over a flat bar defined within the strap flange between the two strap apertures. The strap holds the flat bar of the strap flange flat against the top surface of the casing of the battery which in turn supports the corresponding housing against the top side of the battery casing due to the intermediate location of the flat bar between the housing and the outer free end of the flange.

Figure 2:
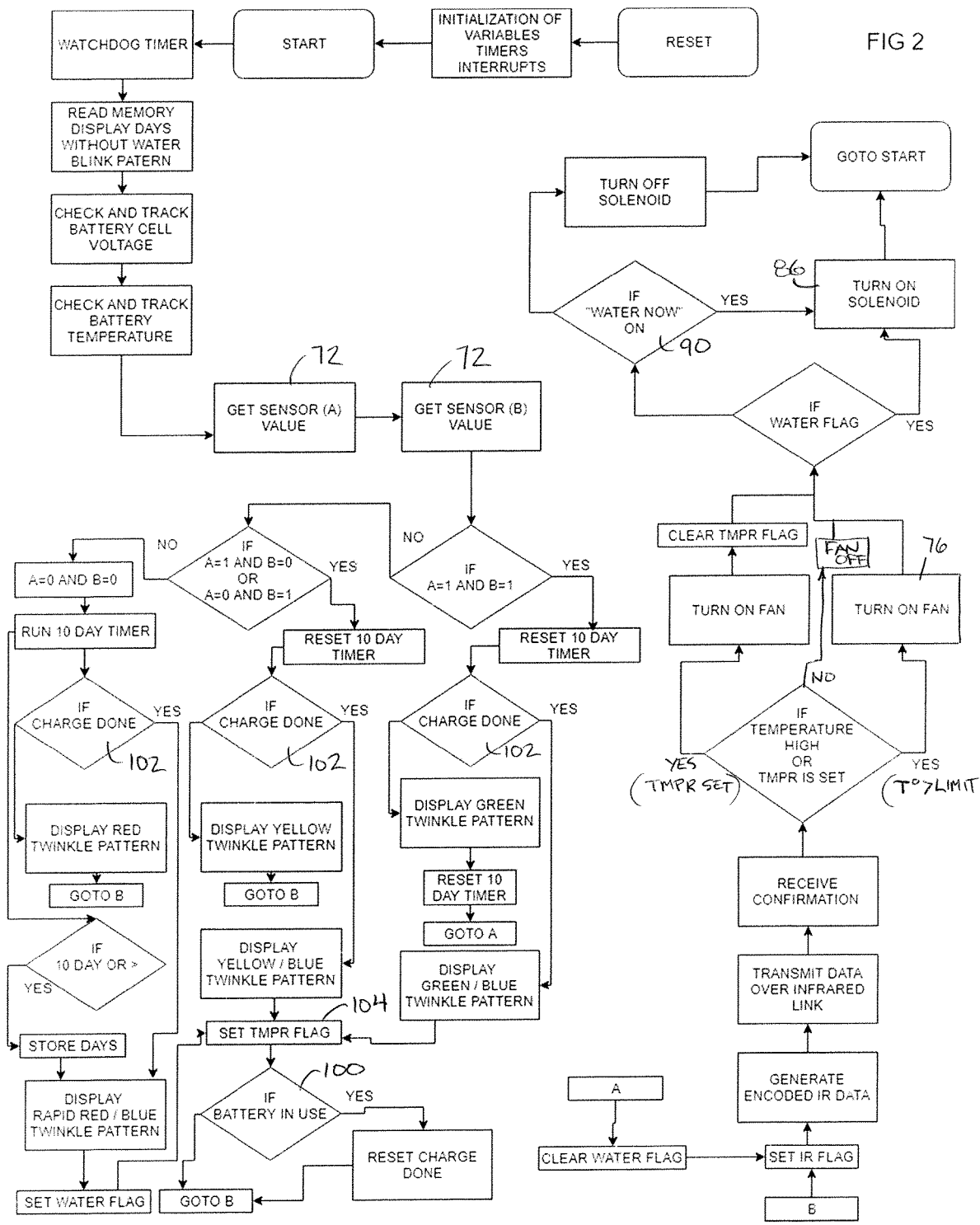
FIG. 2 is a flowchart illustrating the operation of the battery monitoring device.

Turning now more particularly to the method of operation illustrated in FIG. 2, the programming instructions on the main controller are arranged to execute a programming loop at regular intervals on a continuous basis for repeatedly checking battery temperature, battery cell voltage, and electrolyte level according to the various sensors and connections between the main controller and the battery. The collected data is stored by the main controller over time such that the main controller is capable of analysing the history of the data to determine various trends according to how the various sensed conditions vary over time.

The programming loop also includes a counter feature in combination with a clock that tracks the date, for example so that the programming loop can determine if the notification condition determined by the controller remains constant at a red level for example beyond a prescribed duration, such as a 10 day limit, at which point the main controller may alter the indications being output to a more aggressive form of indication such as converting from a red twinkling pattern to a more aggressive rapid blinking pattern when the counter reaches the 10 day limit.

The main controller also includes programming instructions stored thereon which are executed to compare collected data to corresponding criteria to determine if the battery is in use, and to compare collected data to corresponding criteria to determine if the battery is done charging. The battery may be considered to be done charging if either (i) the battery is nearing completion of a charging cycle, (ii) the battery has just completed a charging cycle, or (iii) the battery has just completed a charging cycle and a subsequent cool down period.

The controller will typically monitor the voltage across the battery to determine if the battery is in use at step 100 when the voltage detected across the terminals of the battery remains below a minimum threshold amount.

The controller will also monitor the voltage across the battery to determine if the charge of the battery is done at step 102 when the following trends have been observed by the main controller. More particularly, the controller compares the currently sensed voltage across the terminals and compares the currently sensed voltage to the history of recently sensed voltages. If the voltage is determined to be steadily increasing, the controller determines that the battery is currently charging. If the voltage is held near constant at an upper threshold level, the controller determines that the battery is nearing completion of a charging cycle. Once the monitored voltage drops from the upper threshold level to a lower amount below a lower threshold level, the end of the charging is determined. Subsequent to charging, if either (i) an elapsed period of time after the voltage drop has expired or (ii) the sensed temperature falls below a threshold temperature value, then the controller determines that a cooling down step has been completed. The controller may determine that the charge cycle is done at step 102 when one or more of the above criteria has been met.

In addition to the red, yellow, and green indications which represent the measured electrolyte level within the battery, the indicator assemblies may each be provided with a blue LED light which is actuated to indicate that the charge cycle and cooling down step have been completed.

In addition, a temperature flag is set at step 104 once the cooling down period has been determined. Use of the temperature flag at step 104 enables the controller to actuate the fan upon completion of a charging cycle when the temperature flag is set in addition to independent actuation of the fan whenever the sensed temperature exceeds a prescribed actuation threshold stored on the controller. When activating the fan based on the temperature flag, the fan is only operated for a prescribed duration, for example the duration of one cycle of the programming loop to clear gases from the top of the battery resulting from charging, but then the temperature flag is subsequently cleared so that actuation of the fan according to the temperature flag only occurs for one cycle of the programming loop.

According to the second embodiment shown in FIGS. 7 and 8, the probe 66 in this instance may rely on a reflected light signal to determine if the level of electrolyte solution is above either the minimum operating level or the recommended operation level. In this embodiment, the probe comprises an elongate light pipe 100 which extends in a longitudinal direction from a top end directly mounted to the underside of the controller housing 24 to a bottom end which is arranged to be received within an electrolyte chamber within the battery casing that locates the electrolyte solution therein. The light pipe includes an upper section 102 spanning from the top end of the light pipe to an intermediate location at the recommended operating level in which the upper section has a first diameter, and a lower section 104 spanning from the intermediate location to the bottom and having a second diameter which is reduced relative to the first diameter of the upper section.

A first reflective surface 106 is located at the junction between the upper and lower sections of the light pipe which is generally frustoconical in shape so as to be tapered downwardly and inwardly from the circumference of the upper section 102 to the circumference of the lower section 104.

A second reflective surface 108 is located at the bottom end of the lower section of the light pipe corresponding to the minimum operating level of electrolyte solution within the electrolyte chamber of the battery. The second reflective surface 108 is cone shaped so as to taper downwardly and inwardly towards a central apex. The first and second reflective surfaces are concentric with a common longitudinal axis of the upper and lower sections of the light pipe.

The light pipe is formed of a transparent material suitable for transmitting a light signal therethrough in the longitudinal direction such that the light signal may be reflected on the first and second reflective surfaces. More particularly, the material of the light pipe is such that a reflective coefficient associated with each of the first and second reflective surfaces will vary depending upon whether the reflective surface is immersed within the electrolyte solution or not.

The light pipe is used in operative communication with a light emitter 110 mounted on the printed circuit board of the controller within the controller housing. The light emitter 110 generates the light signal 111 and projects the light signal longitudinally downward through the light pipe. A light receiver 112 is also mounted on the printed circuit board of the controller within the controller housing in operative communication with the light pipe. The light receiver 112 is adapted to receive a reflected portion 113 of the light signal that is reflected from the first or second reflective surfaces.

The controller includes suitable programming so as to be adapted to analyse the reflected portion 113 of the light signal received by the light receiver and determine the reflective coefficient of one or both of the reflective surfaces 106 and 108 according to the characteristics of the reflected portion of the light signal. Based upon the reflected portion of the light signal, the controller will determine (i) a first reflective coefficient associated with the reflective surfaces indicating that neither surface is submerged within the electrolyte solution, (ii) a second reflective coefficient associated with the reflective surfaces indicating that only the second reflective surface at the bottom of the lower section of the light pipe is immersed within the electrolyte solution, or (iii) a third reflective coefficient associated with the reflective surfaces indicating that both reflective surfaces are immersed within the electrolyte solution. Based upon this determination of the reflective coefficient represented by the reflected portion of the light signal, the controller can determine if the level of electrolyte solution is above or below either one of the minimum operating level of the second reflective surface or the recommended operating level of the first reflective surface.

In further embodiments, a single reflective surface at any one prescribed level is sufficient to determine if the electrolyte solution is above or below that level by determining the reflective coefficient associated with the surface according to the reflected portion of the light signal received by the receiver.

As described above, the controller operates the solenoid switch for watering the battery either if prescribed watering criteria are met resulting in a water flag being set or if the manual override switch 90 has been actuated. The solenoid switch for watering the battery is typically only actuated for a brief prescribed duration during each programming cycle.

In order to begin watering by actuating the solenoid switch, the main controller determines if a red notification condition exists due to the electrolyte level being below both the intermediate level and the minimum operating level of the conductors 72 of the level probe, subsequent to determination that the charging of the battery is done at step 102. If this condition has been met, a watering flag is set and remains set with each ongoing cycle of the programming loop for continuing to add measured amounts of fluid with each cycle. The watering flag remains set as the level rises above the minimum prescribed operating level of the lower conductor; however, once the level reaches the intermediate level of the upper conductor, the water flag will be cleared so that no further watering will occur in each subsequent cycle of the programming loop. As the electrolyte level falls over time and falls again below the intermediate level of the uppermost conductor, the watering flag remains off so that no watering begins until the level falls below the minimum operating level of the lower conductor of the probe subsequent to completion of a charging cycle.

If the battery is in use, the main controller will always determine that the battery has not recently completed a charge at step 102 so that there will be no change to the water flag even if the electrolyte level falls below both measured levels of the level probe as no watering can occur when the battery is not in the storage rack connected to the water source and connected to the charger. Even in the event that the water flag remains activated during use of the battery in a lift truck, inadvertent actuation of the watering solenoid by the main controller will have no adverse effects when disconnected from the water source.

As described above, the device 10 was designed to be incorporated on the existing multi-cell flooded lead acid battery. Charging procedures especially in the adverse conditions such as in-truck fast-charging or opportunity charging, at a higher rate than normal produces excess thermal stress on a battery.

The proposed solution described above focuses on three areas of improvement: management, prevention, and faster recovery process in order to minimize the effect of high heat generation in charging and usage operations.

Management focuses in drastically increasing the visibility of the light color codes. This is done using multiple multi color LEDs with proper current correction to create unified color source. The overall diamond and fully transparent shape of the device adds to visibility of the device, which in turn decreases chances of overlooking vital color code condition. It is also highly desirable to provide the user with multiple electrolyte level color code conditions. This has direct physiological effect which allows users again to catch the fault condition in time.

Prevention, focuses on collecting data from Tri-State electrolyte level sensor, battery voltage and battery temperature. Implementation on some redundancy principles and robust analytical engine would allow the system to quickly and accurately determine the current battery condition and put together the best possible solution based on data provided.

Implementation of temperature control module in the system allows to quickly and efficiently bring and keep the battery in the ideal operating conditions. Which increases overall charge efficiency and decreases electrolyte depletion rate. If the conditions are determined to add more water to the battery using electrolyte, battery voltage and temperature feedback, the system will dispense water via single point watering system, which virtually eliminates overwatering and further dilution of electrolyte.

In FIG. 6 it is shown a full representation of the system. It is installed onto a flooded lead acid battery by drilling a hole in a cell cover in the middle of the battery, due to the fact that this cell operates at higher than normal temperatures and is prone to increased electrolyte evaporation rate. The Duel-Channel, Tri-State Multi level probe is inserted into said hole FIG. 1, to monitor and relay information to the main processing unit FIG. 6.1. The wire crimped clip on connectors FIG. 6.6 are installed directly onto the intercell connectors as shown in FIG. 5. The main processing unit is then strapped to the intercell connector FIG. 3 using Double-Laced strap holder FIG. 6.7, which prevents and dampens any vibrations during operation conditions. Side battery visual indicator and horizontal IR port are installed on the side of the battery as shown in FIG. 3. It sends out a horizontal Infrared beam to be picked up by the Proprietary sensor units. The temperature and battery voltage regulated fan FIG. 6.3 is installed onto a battery using double-laced strap holder. The main processing unit FIG. 6.1 activates the battery cooling and volatile gas evacuation procedures based on the temperature and voltage readings. Cool air is pulled into the top battery cavity and is uniformed dispersed using outport fins and fan speed and the duration of the on cycle. Solenoid with "water now" feature FIG. 6.4 is installed on the top of the battery FIG. 3 using double-laced strap holder. The water supply line is then connected to the water line in during the battery charge process. The electrolyte level is constantly monitored using multi-level electrolyte probe FIG. 6.5. To prevent battery overwatering on every charge cycle the electrolyte level, battery voltage and battery temperature data is collected and analysed. If the system FIG. 6.7 determines the water is needed the solenoid valve FIG. 6.4 will open and let water to flow into the battery for a calculated period of time or until electrolyte full status is achieved and sensed by electrolyte probe FIG. 6.5.

Functionality. The system requires 6 nominal 2 volt cells for proper operation FIG. 1. The multi-level electrolyte probe is inserted into the battery between D+ and D− see FIG. 1. A constant current is injected into each channel of the electrolyte sensor and the voltage is monitored. This approach allows to virtually eliminated parasitic capacitance and resistance of the battery sensing circuit. It also allows to install the level probe anywhere on the battery without the risk of voltage oversaturation conditions the limit the probe performance. The multi-level probe also allows to better monitor electrolyte levels at the fringes. It is known that the electrolyte level fluctuates during battery operation and charge cycles. Using multi-level electrolyte probe the uncertainty of the water level in the battery is virtually eliminated. The depth of probe is set up in such a way that the lowest and the highest level of electrolyte inside the battery during operation, do not exceed the sensing ability of the probe, and the levels do not fluctuate with normal electrolyte operational fluctuation. This allows the user to properly water the battery without the risk of overwatering and diluting the battery electrolyte.

The system employs fuse and reverse polarity protection to eliminate human error factor during the installation and operation.

The flow chart FIG. 2 represents the functional diagram of the processes that take place during operation of the device. The device is able to collect electrolyte level, battery voltage and battery temperature data, analyse it and dispatch the necessary processes and procedures. On reset the system goes through initialization procedure and reads memory "days without water" data and displays it using count blink pattern. It then proceeds to collecting data from Multi-Level electrolyte level sensor, battery voltage divider with low pass filter and surface battery temperature. After completion of data collection the analytical processes begin that determine Tri-State electrolyte level condition and battery charge voltage pattern. Based on those two parameters the battery electrolyte level state can be determined. When the state is known the system then proceeds to timer monitoring, flag setting and other intermediate processes. Once completed the system checks for "In Use" condition when battery is taken off charge and put back into circulation. At this stage the system determines to set or clear some operation flags.

The gathered and analysed data is then transferred via Vertical and Horizontal Infrared ports FIG. 3 to Proprietary Receiver modules that decode and output data to user. The system then proceeds to checking temperature conditions and activating fan accordingly. The on time and fan speeds are calculated based on surface temperature and battery voltage conditions. The system will keep the fan on until optimal conditions are reached. Upon completion of this task the system starts initializing and checking "Water Now" feature and based on the data gathered dispenses water if necessary. It then goes back to start and the whole process repeats again.

Figure 10:
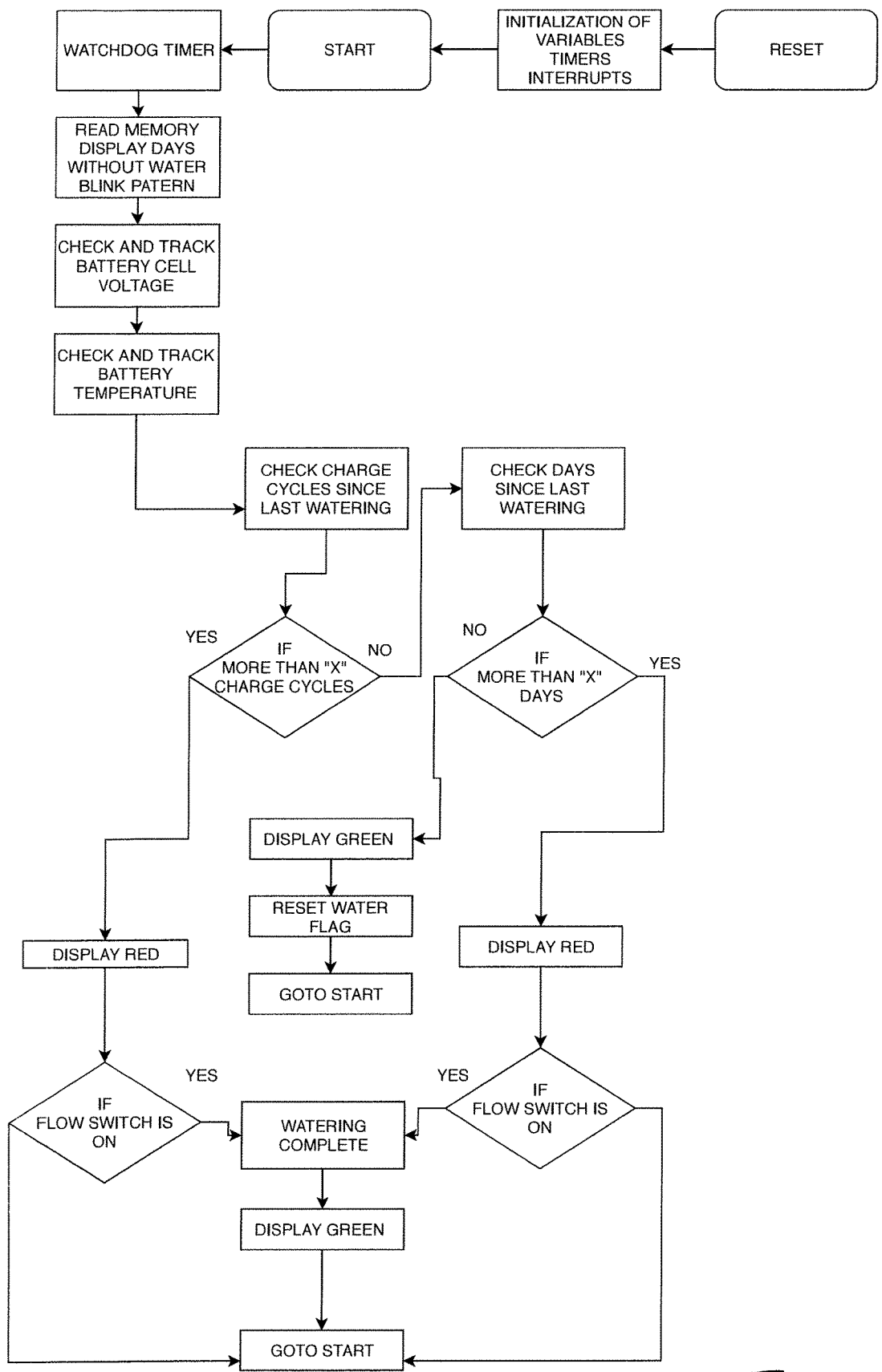
FIG. 10 is a flow chart representing operation of the battery monitoring device according to the second embodiment of FIG. 9.
Figure 11:
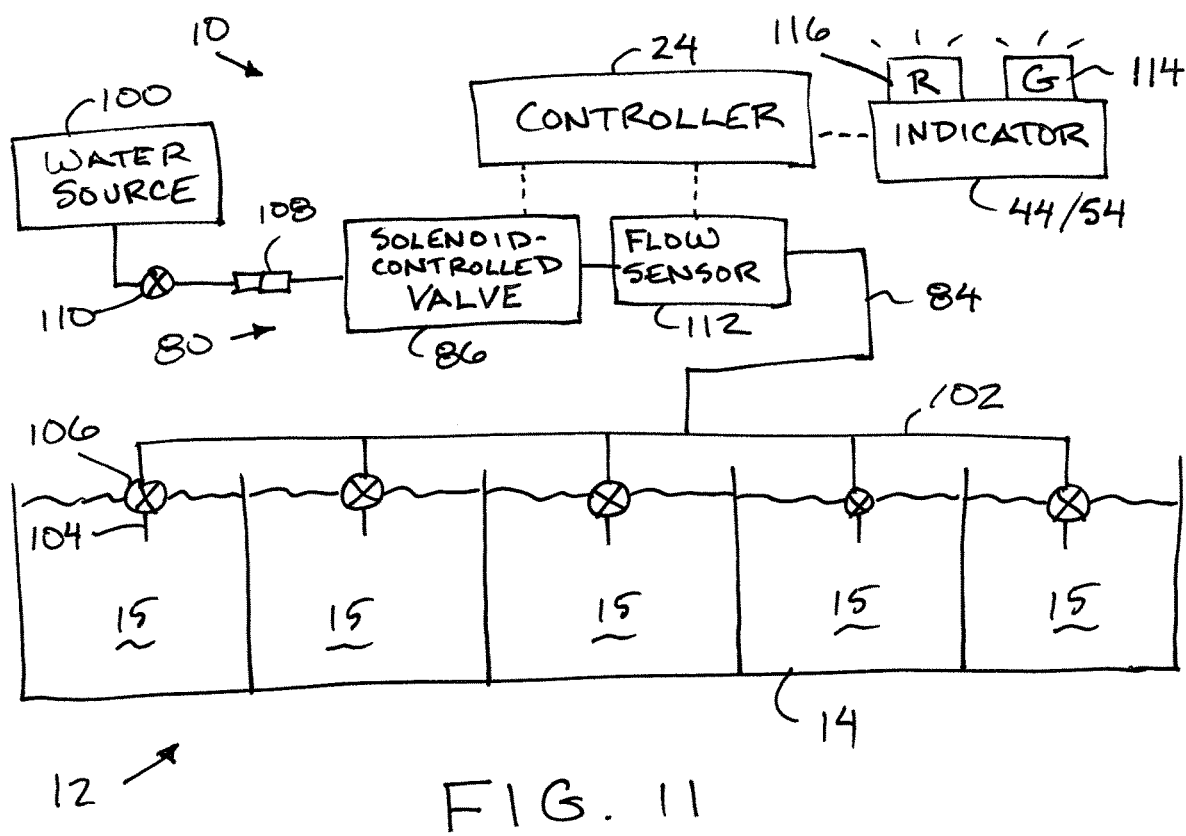
FIG. 11 is a schematic representation of the battery monitoring device installed on a battery according to the second embodiment of FIG. 9.

Turning now to FIGS. 9 through 11, according to a further embodiment, the battery monitoring device 10 in this instance is substantially identical to the previous embodiment with the exception of some changes to the watering device 80 and the indicator assemblies 54 and 44, as well as some of the functionality in view of the noted changes. The monitoring device 10 is again suited for use with a battery 12 having an outer casing 14 defining a plurality of individual cells 15 of the battery in which each cell has a respective level of electrolyte liquid therein in communication with two terminals 16 of the cell. As in the previous embodiment, a single point watering system is provided in the form of a water conduit 84 that is intended for connection to a suitable water source 100 so that water flows from the water source through the conduit 84 and subsequently into a manifold 102 which distributes the fluid to a plurality of dispensing nozzles 104 located in respective ones of the cells 15 of the battery. Each nozzle 104 communicates with a respective branched line of the manifold which includes a float valve 106 connected in series therewith for shutting off flow through the respective branched line when the electrolyte level within the respective cell reaches a recommended fill level as determined by a float member which operates the valve between open and closed positions in a conventional manner. The conduit 84 includes a coupling 108 connected in series therewith between the manifold and the water source to allow the battery to be separated from the water source when the coupling 108 is disconnected. The source 100 preferably also includes a shut off valve 110 to interrupt flow from the source when the coupling 108 is disconnected.

As described in the previous embodiment, a solenoid controlled valve 86 is connected in series with the water conduit 84 such that when the valve is open, fluid is permitted to flow from the water source through the conduit into the manifold for filling any cells in the battery having a branch line which remains open due to the float of the float valve having not yet reached the fill level. Closing the valve 86 interrupts flow through the conduit 84 to the battery. As in the previous embodiment, the solenoid valve 86 may be controlled by the controller 24 for turning on and turning off the watering of the battery according to prescribed criteria.

Alternatively, a manual switch may be provided for specifically controlling the opening and closing of the valve 86 by an operator.

In yet a further arrangement, the valve 86 may be a manually operated valve, again for controlling the opening and closing of the valve by an operator.

The watering device 80 in the second embodiment differs from the previous embodiment by the addition of a flow sensor 112 which is connected in series with the water conduit 84 downstream from the valve 86 and upstream from the manifold 102 for sensing if there is flow through the conduit, and/or sensing a volume of the flow through the conduit. The flow sensor 112 produces a signal indicative of the flow through the conduit 84 and communicates the signal to the controller 24 with which it is operatively connected.

In the second embodiment, the indicating assemblies 44 and 54 again comprise various coloured LED lights. More particularly the indicator assemblies in this instance include a green indicator light defining a positive indicator 114 for indicating to an operator that the battery has been recently watered and/or does not require immediate watering and a red indicator light defining a negative or watering indicator 116 for indicating to an operator that certain watering criteria has been met since the last watering such that the battery now requires watering.

The controller 24 stores the watering criteria thereon and includes appropriate programming to be executed by the processor of the controller for sensing various conditions relating to the battery and comparing the conditions to the watering criteria to determine if a watering condition has been met. Communication of the controller with the flow sensor allows the controller to determine when the battery has last been watered and thus the duration since the last watering. As in the previous embodiment, the controller 24 is also in communication with the pair of terminals of the battery so as to be adapted to determine when the battery has undergone a charging cycle by monitoring the voltage across the battery terminals as described above. A counter of the controller keeps track of the number of charging cycles that the battery has undergone since the last watering of the battery. In this instance, a first criteria to determine a watering condition is if the number of charging cycle since the last watering exceeds a prescribed number of charging cycles stored on the controller as a respective threshold. A second criteria to determine a watering condition is if the number of days since the last watering exceeds a prescribed number of days stored on the controller as a respective threshold.

Turning now to FIG. 11, a flow chart will now be described which represents the routine executed by the controller. At the start of the cycle, a timer controls the time interval between each cycle. At the beginning of the cycle, the controller determines the number of days or duration since the last watering of the battery as determined by the flow sensor 112. This information can be displayed to the operator using a blink pattern by the indicators or another comparable display capable of displaying the information. The controller continues to monitor and track the voltage across the battery cells to assess if the battery is being charged or not. Temperature of the battery is also read using the appropriate temperature sensor as described above in the previous embodiment. The controller then checks the counter to determine the number of charging cycles that have occurred since the last watering of the battery. If the prescribed number of cycles stored on the controller has been exceeded, then a watering condition is determined such that the indicator assemblies are operated to activate the red watering indicator 116 and deactivate the green positive indicator 114. A watering flag is also turned on in instances where the valve 86 is controlled by a solenoid to open and initiate watering when the watering flag is turned on by the controller. The controller subsequently checks if the flow sensor 112 is detecting a flow. If a flow through the conduit 84 is detected, the controller determines that a watering cycle has been done and then instructs the indicator assemblies such that the red watering indicator 116 is deactivated and the green positive indicator 114 is activated followed by resuming of the next cycle.

Alternatively, if the prescribed number of charge cycles has not been met, the controller then checks if the duration since the last watering exceeds the prescribed duration stored on the controller. If this second watering criteria has been met, then a similar process occurs in that the red watering indicator 116 is activated in the green positive indicator 114 is deactivated. The watering flag is again turned on for subsequent opening of the valve 86 in an automated system. Otherwise, activation of red the watering indicator 116 if either watering condition has been met serves as instruction to an operator to manually open the valve and water the battery until all of the cells are full. If a flow through the conduit 84 is detected, the controller determines that a watering cycle has been completed and then instructs the indicator assemblies such that the red watering indicator 116 is deactivated and the green positive indicator 114 is activated followed by resuming of the next cycle.

Alternatively, if neither of the watering conditions has been met, the system instead activates the positive indicator 114 and deactivates the watering indicator 116 in the water flag is reset or turned off before the controller resumes the next cycle of operation.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A device for monitoring a battery having multiple cells and a varying electrolyte level, the device comprising:
   a water conduit connectable to a water source;
   a plurality of nozzles adapted to be mounted on the battery in communication with the multiple cells respectively;
   the plurality of nozzles being connected to the water conduit so as to receive a flow of water from the water conduit through the nozzles for distribution to the multiple cells of the battery;
   a flow sensor operatively connected to the water conduit so as to be arranged to detect a flow of water through the water conduit;
   a positive indicator which is indicative that the battery has been watered;
   and a controller operatively connected to the flow sensor and the indicator so as to be arranged to operate the positive indicator in response to detection of the flow of water through the water conduit so as to indicate that the battery has been watered.

2. The device according to claim 1 further comprising a solenoid-controlled valve operatively connected between the water conduit and the plurality of nozzles so as to be operable between an open condition permitting a flow of water from the water conduit through the nozzles for distribution to the multiple cells of the battery and a closed condition interrupting the flow of water from the water conduit to the nozzles, the controller being arranged to close the solenoid-controlled valve in response to detection of an absence of the flow of water through the conduit by the flow sensor.

3. The device according to claim 1 wherein the controller including a memory storing watering criteria and programming instructions thereon and a processor for executing the programming instructions so as to be arranged to (i) communicate with the flow sensor to determine when the battery has been watered, (ii) determine a watering condition in response to watering criteria since last watering of the battery being met, and (iii) deactivate the positive indicator in response to determination of the watering condition.

4. The device according to claim 3 further comprising:
   the controller being operatively connected between a pair of terminals of the battery so as to be adapted to determine when the battery has undergone a charging cycle; and
   the watering criteria including a prescribed number of charging cycles such that the watering condition is determined to be met if the number of charging cycles since the flow sensor has detected the flow of water through the water conduit exceeds the prescribed number of charging cycles.

5. The device according to claim 3 further comprising:
   the controller being adapted to determine a duration since the flow sensor has detected the flow of water through the water conduit; and
   the watering criteria including a prescribed duration such that the watering condition is determined to be met if the duration since the flow sensor has detected the flow of water through the water conduit exceeds the prescribed duration.

6. The device according to claim 3 further comprising
   the controller being operatively connected between a pair of terminals of the battery so as to be adapted to determine when the battery has undergone a charging cycle;
   the controller being adapted to determine a duration since the flow sensor has detected the flow of water through the water conduit; and
   the watering criteria including both a prescribed number of charging cycles and a prescribed duration such that the watering condition is determined to be met if either (i) the number of charging cycles since the flow sensor has detected the flow of water through the water conduit exceeds the prescribed number of charging cycles, or (ii) the duration since the flow sensor has detected the flow of water through the water conduit exceeds the prescribed duration.

7. The device according to claim 3 further comprising a watering indicator which is indicative that the battery needs to be watered, the controller being arranged to activate the watering indicator in response to determination of the watering condition.

8. The device according to claim 3 further comprising a solenoid-controlled valve operatively connected between the water conduit and the plurality of nozzles so as to be operable between an open condition permitting a flow of water from the water conduit through the nozzles for distribution to the multiple cells of the battery and a closed condition interrupting the flow of water from the water conduit to the nozzles, the controller being arranged to open the solenoid-controlled valve in response to determination of the watering condition.

9. A device for monitoring a battery having multiple cells and a varying electrolyte level, the device comprising:
   a water conduit connectable to a water source;
   a plurality of nozzles adapted to be mounted on the battery in communication with the multiple cells respectively;
   the plurality of nozzles being connected to the water conduit so as to receive a flow of water from the water conduit through the nozzles for distribution to the multiple cells of the battery;
   a flow sensor operatively connected to the water conduit so as to be arranged to detect a flow of water through the water conduit;
   a watering indicator which is indicative that the battery needs watering;
   a controller operatively connected to a pair of terminals of the battery and to the flow sensor;
   the controller including a memory storing watering criteria and programming instructions thereon and a processor for executing the programming instructions so as to be arranged to (i) communicate with the flow sensor to determine when the battery has been watered (ii) determine a watering condition in response to watering criteria since last watering of the battery being met, and (iii) activate the watering indicator in response to determination of the watering condition.

10. The device according to claim 9 further comprising:
the controller being operatively connected between a pair of terminals of the battery so as to be adapted to determine when the battery has undergone a charging cycle; and
the watering criteria including a prescribed number of charging cycles such that the watering condition is determined to be met if the number of charging cycles since the flow sensor has detected the flow of water through the water conduit exceeds the prescribed number of charging cycles.

11. The device according to claim 10 further comprising:
the controller being adapted to determine a duration since the flow sensor has detected the flow of water through the water conduit; and
the watering criteria including a prescribed duration such that the watering condition is determined to be met if the duration since the flow sensor has detected the flow of water through the water conduit exceeds the prescribed duration.

12. The device according to claim 10 further comprising
the controller being operatively connected between a pair of terminals of the battery so as to be adapted to determine when the battery has undergone a charging cycle;
the controller being adapted to determine a duration since the flow sensor has detected the flow of water through the water conduit; and
the watering criteria including both a prescribed number of charging cycles and a prescribed duration such that the watering condition is determined to be met if either (i) the number of charging cycles since the flow sensor has detected the flow of water through the water conduit exceeds the prescribed number of charging cycles, or (ii) the duration since the flow sensor has detected the flow of water through the water conduit exceeds the prescribed duration.

13. The device according to claim 10 further comprising a solenoid-controlled valve operatively connected between the water conduit and the plurality of nozzles so as to be operable between an open condition permitting a flow of water from the water conduit through the nozzles for distribution to the multiple cells of the battery and a closed condition interrupting the flow of water from the water conduit to the nozzles, the controller being arranged to open the solenoid-controlled valve in response to determination of the watering condition.

14. A device for monitoring a battery, the device comprising:
a temperature sensor adapted to be operatively connected to the battery so as to sense a temperature of the battery;
a voltage sensor configured to monitor a voltage across two terminals of the battery;
a controller in communication with the temperature sensor and the voltage sensor, the controller including a memory storing programming instructions thereon and a processor for executing the programming instructions whereby:
(i) the controller is adapted to determine an overheated condition when the temperature sensor senses that the temperature is above a prescribed temperature threshold; and
(ii) the controller is adapted to compare the voltage monitored across the terminals to charge completion criteria and to determine the overheated condition when the voltage monitored across the terminals meets the charge completion criteria, in which the charge completion criteria are indicative of completion of a charging cycle of the battery; and
a fan being operatively connected to the controller so as to be operable from an inactive state to an active state responsive to determination of the overheated condition.

15. The device according to claim 14 wherein the fan is further adapted to be supported on a top side of the battery so as to direct a flow of air across the top side of the battery in the active state.

16. The device according to claim 14 wherein the fan is further adapted to be in electrical connection with the battery so as to draw power from the battery in the active state of the fan.

17. The device according to claim 14 wherein the fan housing includes a strap flange at a bottom side of the housing and protruding laterally outwardly from one side of the housing towards an outer free edge of the strap flange, the strap flange including a strap receiving aperture therein at a location spaced laterally inwardly from the outer free edge, the strap receiving aperture being adapted to a strap secured about the battery so as to strap the strap flange flat against an outer surface of the battery.

18. The device according to claim 14 wherein the charge completion criteria corresponds to the voltage being held near constant at an upper threshold level followed by a drop in the voltage from the upper threshold level to a lower amount below a lower threshold level.

* * * * *